Oct. 4, 1949.
S. C. CARNEY
2,483,487
SEPARATION OF VOLATILIZABLE METAL
HALIDES FROM ADSORBENTS
Filed Sept. 27, 1946
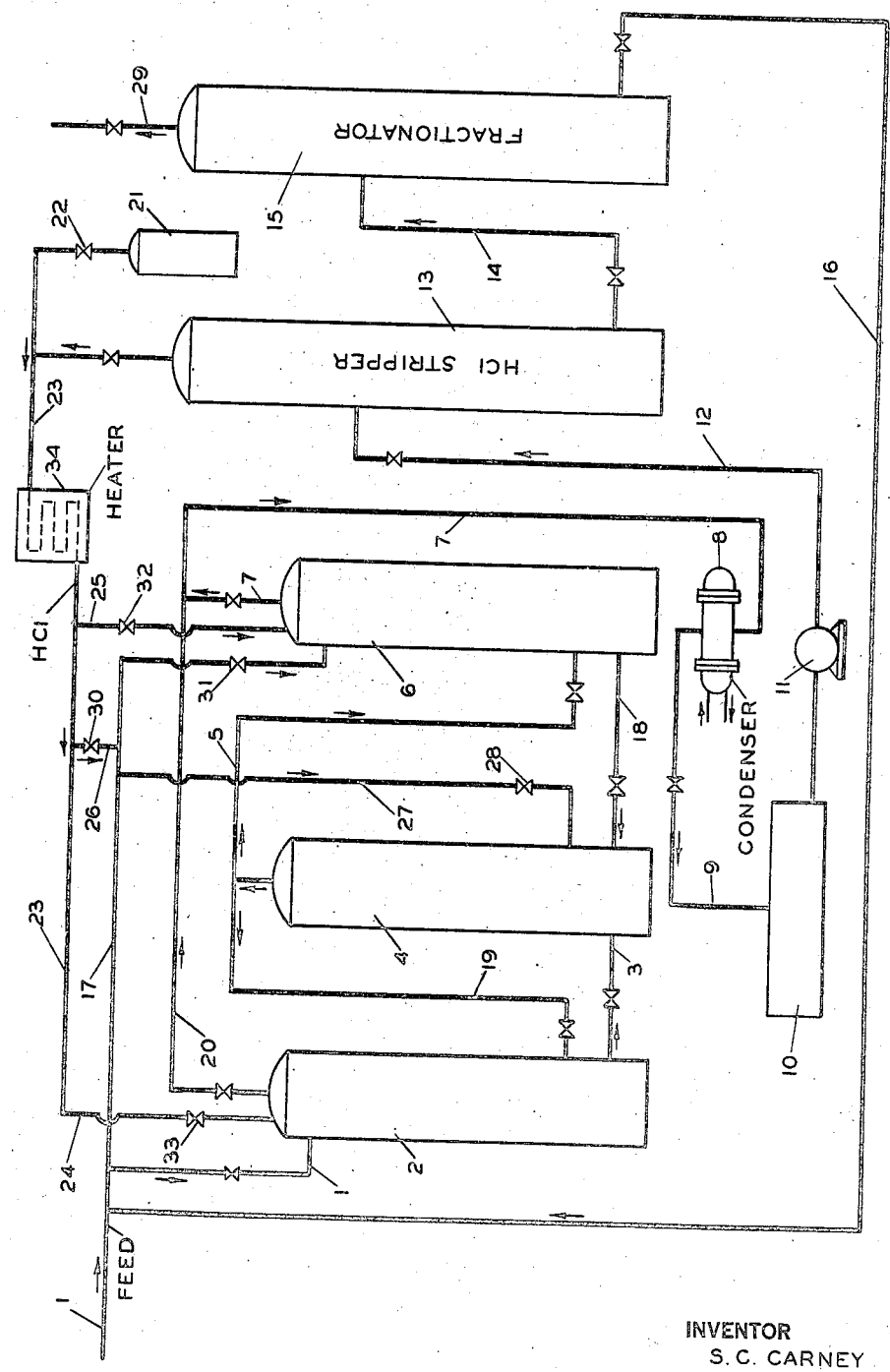
INVENTOR
S. C. CARNEY
BY
Hudson and Young
ATTORNEYS Patented Oct. 4, 1949

2,483,487

UNITED STATES PATENT OFFICE 2,483,487

SEPARATION OF VOLATILIZABLE METAL HALIDES FROM ADSORBENTS

Samuel C. Carney, Bartlesville, Okla., assignor to Phillips Petroleum Company, a corporation of Delaware Application September 27, 1946, Serial No. 699,664

12 Claims. (Cl. 23—96)

This invention relates to the separation of metal halides of the Friedel-Crafts type from solid adsorbents. In a particular embodiment, the invention relates to the desorption of such metal halides which have been adsorbed on the surface of solid inorganic adsorbents. The invention especially relates to the use of anhydrous hydrogen halides to aid in the recovery of metal halides. The invention in some aspects relates to the conversion of hydrocarbons in the presence of a metal halide catalyst of the Friedel-Crafts type. In one specific embodiment the invention relates to the isomerization of saturated hydrocarbons in the vapor phase wherein a fugitive metal halide catalyst is utilized in the presence of a hydrogen halide and a solid adsorbent material. A particular modification of the invention involves utilization of a solid adsorbent material both as a catalyst support and as a means of avoiding passage of catalyst vapors from the reaction system by adsorption of catalyst vapors on the solid adsorbent, wherein periodic desorption of catalyst is accomplished through control of the hydrogen halide content of the vapors.

This application is a continuation-in-part of my copending application Serial No. 512,797, filed December 3, 1943, now Patent No. 2,429,218.

The use of Friedel-Crafts type metal halides, such as aluminum, iron, antimony, tin, zirconium and other polyvalent metal halides, as catalyst in various hydrocarbon conversions has become well established. Among the conversions of the greatest interest at the present time may be mentioned the alkylation of aromatic, cycloaliphatic and aliphatic hydrocarbons by olefins, alkyl halides and other alkylating reactants. Another commercially important process is the isomerization of saturated hydrocarbons. In such conversions the aluminum halides, especially the chloride and bromide, are most frequently applied as catalysts due primarily to their low cost and suitable activity. The present invention is particularly applicable in the isomerization of paraffinic hydrocarbons as exemplified by the conversion of normal butane to isobutane and will be described with specific reference thereto. Methods of applying the principles of the invention to other conversions will be apparent to those skilled in the art from the detailed disclosure offered herein.

Isobutane is a valuable hydrocarbon which may for example be alkylated to produce normally liquid branched-chain paraffins, or which may be dehydrogenated and the resulting olefins polymerized and hydrogenated, in either case the resulting products being important components of aviation gasolines. Aluminum chloride, activated with minor amounts of hydrogen chloride, has been used commercially for some time in the isomerization of normal butane to produce isobutane. The aluminum chloride has been used in lump or slurry form, and has also been supported on various solid inorganic materials, including non-porous supports such as porcelain, and porous supports such as activated charcoal, pumice, fuller's earth, adsorptive alumina, etc. Certain of these supports, in addition to providing a large surface area, seem to increase the catalytic effectiveness of the aluminum chloride, while others are substantially inert. Regardless of the type of catalyst used, considerable trouble has been encountered in actual practice due to the volatility or solubility of aluminum chloride in gaseous or liquid reaction mixtures, which causes isomerization effluents to carry substantial quantities of catalyst out of the reaction zone and into the subsequent portions of the equipment. In an attempt to avoid this it has been proposed to contact isomerization effluents with and adsorptive alumina whereby aluminum chloride is retained by the alumina. It has also been proposed to operate such a bed of adsorptive alumina at a relatively low temperature, and after it has become saturated with aluminum chloride to raise the temperature and reverse the flow of gases through the system in order to revaporize and return some of the thus adsorbed aluminum chloride to the system. However, these proposed processes have not been entirely satisfactory inasmuch as it is difficult to recover aluminum chloride from the adsorbent to such an extent that the adsorbent may be reused efficiently for the same purpose. Furthermore, large alterations in temperature are inconvenient and expensive.

There are other instances in which aluminum chloride and other metal halides are found in admixture with solid adsorbents. For example, in many organic reactions, particularly those known as the Friedel-Crafts reactions and modifications thereof the aluminum chloride is used in the form of a liquid complex, or liquid complexes are formed during the reaction. These complexes are composed of aluminum chloride and organic material and it is important to the economy of a process that as much aluminum chloride be recovered therefrom as possible. Such recovery may be accomplished by destructive distillation, with or without the presence of gases, which may include anhydrous hydrogen chloride. Vapors withdrawn from the aluminum chloride recovery step and carrying aluminum chloride may be passed in contact with a solid adsorbent either to recover the total aluminum chloride content from the vapors, or to recover residual aluminum chloride from the vapors after the bulk of the aluminum chloride has been separated therefrom by condensation or otherwise. The subsequent recovery of aluminum chloride from the AlCl₃-enriched adsorbent presents problems, in that incomplete recovery is usually realized. Furthermore, substantial amounts of the aluminum chloride may be lost completely by formation of aluminum oxychloride or other oxygen-containing aluminum compounds, usually due to the action of small amounts of water found in the adsorbent.

In the commercial manufacture of aluminum chloride, which is usually accomplished by direct chlorination of aluminum oxide-containing ores, either in the presence or absence of carbon, tail gases containing residual aluminum chloride may be contacted with an adsorbent for recovery of the aluminum chloride before discarding the gases or reusing same in the process. Separation of the thus-adsorbed aluminum chloride from the adsorbent presents problems similar to those discussed above.

It is an object of this invention to separate mixtures of metal halides with solid adsorbents into their components.

Another object is to increase the recovery of aluminum chloride which is being desorbed from a solid adsorbent.

Yet another object is to recover a solid inorganic adsorbent material from admixture with a metal halide, in a substantially metal halide-free condition.

It is an important object of this invention to affect the vapor phase isomerization of normal butane with an aluminum chloride-hydrogen chloride catalyst wherein the carrying out of catalyst in vaporous effluents from the reaction zone is avoided.

It is a further object to effect the regeneration of solid adsorbent material used to adsorb a fugitive catalyst.

Another object is to effect the isomerization of saturated hydrocarbons in the presence of a supported metal halide catalyst of the Friedel-Crafts type.

A still further object is to effect a reactivation of such a catalyst in situ.

Yet another object is to provide a continuous cyclic process for the catalytic isomerization of hydrocarbons.

Further objects and advantages of the invention will be apparent, to one skilled in the art, from the accompanying disclosure and discussion.

Broadly speaking, my invention involves the passage of a gas comprising an anhydrous hydrogen halide through a body of solid adsorbent which is admixed with a volatilizable metal halide under conditions which effect the carrying away of metal halide from the adsorbent in the hydrogen halide-containing gas. Preferably the hydrogen halide is used in admixture with another gas which is substantially non-reactive with the metal halide under the conditions of the process. From the present specification it will be clear that by "gas which is substantially non-reactive with the metal halide under the conditions" I mean a gas and conditions which permit prolonged contact of gas with the metal halide without quickly destroying the latter chemically, although the term obviously does not intend to exclude a slight amount of reaction of gas with metal halide such as for example the slow formation of hydrocarbon AlCl₃ complex or sludge which is known to occur when normal butane is used as the gas as described herein; the term also obviously does not exclude isomerization or other reactions of the gas itself alone or with materials other than the metal halide, as such reactions can occur in the presence of the metal halide concomitantly with the desorption of metal halide. The desorption procedure is desirably initiated with a gas containing only a minor portion of the hydrogen halide. The other component of the gas mixture may be a non-polar gas such as a low-boiling saturated hydrocarbon, for example methane, propane, or butane, or it may be hydrogen, nitrogen, or other inert gas. As the desorption proceeds, the hydrogen halide content of the gas may be increased, so that as the last quantities of metal halide are being removed the gas will ordinarily contain a major proportion of hydrogen halide and may even be substantially pure hydrogen halide. For best results the halogen of the hydrogen halide should correspond to the halogen of the metal halide. By employing an increased hydrogen halide content, the metal halide recovery is increased over that obtainable in the absence of the increased hydrogen halide content. Two possible reasons may be ascribed to this phenomenon, although the invention does not depend upon the accuracy of any particular theory. It is thought that the hydrogen halide, being more polar than the metal halide, is adsorbed preferentially over the metal halide. It is also believed that the increased partial pressure of hydrogen halide serves to decompose, or at least minimize formation of, oxygenated compounds of the metal halide.

In one preferred embodiment, briefly described, the invention comprises passing a vaporized normal butane feed containing hydrogen chloride in catalyst-activating amount through a first zone containing a solid adsorbent material having aluminum chloride adsorbed thereon under conditions such that some aluminum chloride is desorbed therefrom and incorporated in the vapor stream, then passing the resulting vapors through a reaction zone containing an aluminum chloride isomerization catalyst which may or may not be supported as desired, and which is maintained under isomerization conditions of temperature and pressure, then passing effluents from said reaction zone through a second zone containing a solid adsorbent material under conditions effecting substantially complete adsorption of aluminum chloride vapors, and recovering isobutane from the essentially aluminum chloride-free effluents. After a period of time the efficiency of the desorption of aluminum chloride from the first zone tends to decrease, whereupon the proportion of hydrogen chloride in the vapors passing through said zone is increased. It has been found that such an increase in hydrogen chloride concentration encourages the desorption of aluminum chloride, and preferably the hydrogen chloride content is increased gradually until a vapor stream is passing through the first zone which is as rich in hydrogen chloride as is obtainable in the system. By this means a much more complete desorption of aluminum chloride is realized than would otherwise be the case, and the adsorbent in the first zone is thus conditioned more effectively for a subsequent use in treating effluents. While this increase in hydrogen chloride content of the vapors in the first zone is being effected it is preferred to supply substantially constant amounts of hydrocarbon to the balance of the isomerization system, and this is readily done by diverting flow of normal butane vapors from the first zone to the inlet of the aforementioned reaction zone. Usually it is not necessary to increase the total amount of hydrogen chloride being supplied to the first zone. The various zones are so proportioned and the conditions are so maintained that the operation just described can be completed prior to a time at which the adsorbent in the second adsorbent-containing zone becomes saturated with aluminum chloride, and in this manner the effluents from the process are always maintained substantially free from aluminum chloride.

The next step in the cyclic process, is a reversal in the direction of flow of vapors through the system, so that aluminum chloride is now desorbed from the second zone containing adsorbent, vapors then pass through the reaction zone, and aluminum chloride is then adsorbed from the vapors by the adsorbent in the first zone which has been conditioned for this function in the manner just described. Ordinarily when this reversal of flow is effected the hydrogen chloride content of the vapors passing to the inlet of the system, in this case the second adsorbent zone, is reduced to its normal value, and the system may be operated for an appreciable length of time before it is necessary to increase the hydrogen chloride content for the purpose of effecting a more complete desorption of aluminum chloride in the second zone in a manner similar to that described above with reference to the first zone. After such a desorption is accomplished the flow is again reversed and the complete cycle repeated.

In effect, the first and second adsorbent zones are merely reversed in position with respect to the flow of vapors through the system, each zone going through a cycle comprising adsorption of aluminum chloride vapors from aluminum chloride effluents and desorption of aluminum chloride into a stream of incoming vapors. It is generally preferred that the beds of adsorbent be relatively elongated and that the direction of flow of gas therethrough be reversed periodically. When such an arrangement is utilized it will be seen that the adsorbent bed first used in the outlet portion will adsorb aluminum chloride first at the end at which vapors are introduced and that the aluminum chloride content of the bed will gradually increase in the direction of flow of vapors so that the vapors always contact last the portion of the bed containing a minimum amount of aluminum chloride. It has been found that many adsorbents provide an active isomerization catalyst when carrying only a few per cent of aluminum chloride by weight, such as from 2 to 5 per cent and higher, and the bed in question accordingly acquires and maintains catalytic activity sufficient to effect a substantial amount of conversion, thus serving a dual purpose. In fact, it is not necessary that a reaction zone proper, as hereinbefore described, be used and the invention may be practiced in a system comprising only two beds or one single elongated bed of adsorbent material with the isomerization reaction being effected in the intermediate portions of the bed or beds.

Numerous adsorbent solids may be utilized in the practice of my invention as will be readily appreciated by one skilled in the art. However, it is understood that one adsorbent will not necessarily give results which are exactly equivalent to those obtainable from any other adsorbent, and the choice for any particular situation will be made with regard to such factors as availability and price of adsorbent, catalytic activity of aluminum chloride when supported on a given adsorbent, effectiveness of the adsorbent in adsorbing and desorbing aluminum chloride vapors, etc. Merely by way of example may be mentioned activated charcoal, activated alumina, fuller's earth, natural and artificial zeolites, silica gel, various natural and synthetically prepared clay-like materials, bauxite, particularly a specially prepared low iron-content bauxite sold under the name of "Porocel," etc. These materials may first be calcined to any desired extent prior to use. It is not required that the same adsorbent be utilized in all parts of the same system, but a smoother operation is generally obtainable if this is done. The adsorbents may be used in such size as will provide optimum contact with gases without unduly impeding the flow of gases through the bed; generally from 2 to 16 mesh will be found satisfactory. It is also sometimes advantageous to employ the adsorbent in finely divided or powdered form, which may be suspended in the vapors from which metal halide is being recovered or which are being used to desorb metal halide from the powdered adsorbent.

While the temperatures of the adsorbent beds of this invention may be varied while the process is being carried out in order to encourage adsorption of aluminum chloride on the one hand by lower temperatures and desorption of aluminum chloride on the other by higher temperatures, it will be found that such fluctuations in temperature need not be resorted to and the disadvantages of operating in such a manner frequently outweigh advantages to be gained. It is, in fact, an important advantage of the present invention that such temperature changes are not required due to the novel method of desorbing aluminum chloride by use of increased hydrogen chloride concentrations as described. Accordingly, the ordinary and preferred manner of operation used in carrying out my invention involves the maintenance of all portions of the isomerization zone, or zones, including both the inlet and outlet beds of adsorbent, at temperatures and pressures within the range of isomerization reaction conditions. For example, in the isomerization of normal butane temperatures of from about 175 to about 400° F. are suitable, while in isomerizing higher boiling saturated hydrocarbons, such as normal pentane, methylcyclopentane, etc., lower temperatures are generally preferred in order to minimize cracking and other undesired side reactions. Pressures may range from atmospheric or less on up to several hundred pounds per square inch and are limited to a certain extent by the volatility of the hydrocarbon or hydrocarbons being isomerized and by the phase conditions desired within the system.

The normal concentration of hydrogen chloride in the gaseous reaction mixture will generally vary from about one to about ten mol per cent. During the latter stages of desorption the hydrogen chloride content of the vapors in the bed of adsorbent being subjected to such desorption may range up to as high as 75 or 80 mol per cent and even as high as 100 per cent if hydrogen chloride of such purity is readily available in the system. Usually the recycle stream of hydrogen chloride will not be absolutely pure, containing some light gases such as hydrogen, methane, ethane and/or propane, but the required desorption is readily effected by such a recycle stream, and any increased concentration of HCl over that normally used for the isomerization may be utilized to advantage. Preferably the hydrogen chloride concentration in the principal regions of isomerization is maintained at or near the normal level even while desorption is being effected in another part of the system.

The invention may be more fully understood by reference to the accompanying drawing which is a diagrammatic representation of one preferred arrangement of elements suitable for carrying out the isomerization of normal butane in the vapor phase. It will be appreciated that the drawing is schematic in nature, and no attempt has been made to show or indicate various other pieces of equipment which are required in actual operation, such as pumps, heat exchangers, temperature and pressure controlling devices, and numerous other items, since these elements are readily supplied by one skilled in the art once given the principles upon which the invention is based.

In the drawing, unit 4 represents a primary reaction chamber containing an aluminum chloride catalyst while units 2 and 6 represent chambers containing a suitable solid adsorbent capable of adsorbing aluminum chloride from the vapors in the system and desorbing the same under the conditions recited herein. The catalyst in chamber 4 may comprise merely lumps of solid anhydrous aluminum chloride or it may comprise aluminum chloride on a solid adsorbent the same as or different from that used in chambers 2 and 6. In starting up the system normal butane charging stock is vaporized by means not shown and passed through line 1 into the top of chamber 2. The vapors are passed downward through chamber 2, through line 3 to the bottom of chamber 4, upward therethrough, thence via line 5 to the bottom of chamber 6, then out of the top of chamber 6 into line 7. From line 7 the isomerization reaction mixture effluents pass through means 8 wherein they are subjected to partial or complete condensation, and thence via line 9 into surge tank 10. Hydrogen chloride is charged from cylinder 21 through valve 22, together with any available from recycle, passes through line 23 in which may be interposed a heater 34 if desired, and is admixed with the hydrocarbon feed in desired amount by means of lines 26 and 17 and valve 30.

During the initial period of operation the adsorbent in chamber 2 becomes saturated with butane and hydrogen chloride at conditions prevailing therein, isomerization of the normal butane to form isobutane is effected in chamber 4, and effluents therefrom which include a small proportion of volatilized aluminum chloride are passed through chamber 6 wherein the aluminum chloride is adsorbed. As the catalyst is thus carried from chamber 4 into the bottom of chamber 6 the lower portions of the adsorbent in chamber 6 soon become sufficiently impregnated with aluminum chloride to act as a supported catalyst and further conversion is thus obtained. As the flow continues, aluminum chloride gradually works its way upward in chamber 6 so that more and more of the adsorbent therein becomes laden with the catalyst, although the upper parts of the adsorbent are still sufficiently low in aluminum chloride to effect substantially complete adsorption so that a catalyst-free effluent is obtained in line 7.

Prior to the time at which catalyst vapor would begin to escape from the top of chamber 6, the entire vapor flow, including hydrogen chloride, is reversed and delivered through line 17 and valve 31 into the top of and down through chamber 6. The vaporous reaction mixture then flows from the bottom of chamber 6 through line 18, upward through column 4, through line 19 into chamber 2, upward through chamber 2, and out through line 20 into line 7. The direction of flow is thus reversed through chamber 6 and chamber 2, but is in the same direction through chamber 4. The direction of flow through chamber 4 in the arrangement shown is not particularly critical when solid aluminum chloride is used therein, but the direction of flow through chambers 6 and 2 is important. It will be seen that by reversing the flow through these two chambers the aluminum chloride will be desorbed from chamber 6 most efficiently and will be adsorbed in chamber 2 in such a manner that the last increments of adsorbent in chamber 2 which are contacted by the effluent vapors have the lowest content of aluminum chloride. This reversal of flow begins the regeneration of chamber 6 as an adsorbent and the activation of chamber 2 as a catalyst. As the activity of chamber 6 declines due to the progressive removal of aluminum chloride therefrom the activity of chamber 2 increases. The catalyst in chamber 4 serves to effect a desired amount of isomerization therein and any aluminum chloride volatilized therefrom passes into the lower part of chamber 2 and is there adsorbed.

It is found that the amount of catalyst which can be desorbed from the solid adsorbent in chamber 6 by the flow of vapors having a normal hydrogen chloride content is limited. Accordingly, when the rate of desorption in chamber 6 begins to decrease to an undesired extent and when chamber 2 is still only partly charged with adsorbed aluminum chloride, a change in the vapor flow is initiated. Valve 28 in line 27 is partly opened, valve 30 in line 26 is entirely closed, valve 31 in line 17 leading into the top of chamber 6 is partly closed, and valve 32 in line 25 is partly opened. By suitable control of the valves mentioned, while observing the temperatures in chamber 6, the concentration of hydrogen chloride entering the top of chamber 6 is increased, preferably gradually. This increased concentration serves to effect a further desorption of aluminum chloride from the solid adsorbent. It is believed that the hydrogen chloride is selectively adsorbed by the adsorbent material, with the aluminum chloride being concomitantly displaced or desorbed. However, regardless of any theories that may be advanced to explain the action of increased hydrogen chloride concentrations, the adsorbent in chamber 6 is regenerated to such an extent by the practice of this invention that when it is again placed in use for treating effluent vapors it may be used for a considerably longer period of time than would otherwise be possible before aluminum chloride is noted in the effluents. In regenerating chamber 6 as an adsorbent, the full concentration of hydrogen chloride in line 23 is finally used to complete the desorption. At this time the entry of butane vapor through the top of chamber 6 is entirely shut off and the butane is passed into the base of chamber 4 through line 27 controlled by valve 28. By the proper manipulation of the valves the amount of butane and of hydrogen chloride entering chamber 4 may be maintained at the normal levels during this desorption if desired.

While the reactivation of chamber 6 as an adsorbent is being carried out in the manner described the adsorbent material in chamber 2 acts first as an adsorbent for aluminum chloride vapors and later also as a catalyst in the lower part of the bed. The cycle is so timed and controlled that the reactivation of chamber 6 is completed before the upper part of the bed in chamber 2 loses its capacity to effect substantially completely its adsorption of aluminum chloride vapors. The flow of gases is again reversed so that catalyst is desorbed from chamber 2 and adsorbed in chamber 6. After a suitable period of operation the steps set forth above are repeated to complete the reactivation of chamber 2 as an adsorbent, using line 24 and valve 33 in order to control the concentration of hydrogen chloride in the vapors passed to the top of chamber 2. An increasing proportion of the butane feed is led through line 27 and valve 28 into chamber 4 so that finally the entire hydrocarbon portion of the feed may pass via this route while the entire hydrogen chloride portion of the feed may pass through chamber 2 to complete the desorption. The cyclic operation which has been disclosed may be continued indefinitely with satisfactory results.

Turning now to the treatment of reaction effluents, the partially or totally condensed material is led from accumulator 10 via pump 11 and line 12 into column 13 which may be operated either as a stripper or as a refluxed fractionator to recover hydrogen chloride overhead, which is recycled through the process. Bottoms from column 13, which are practically free from hydrogen chloride and which may or may not contain small proportions of propane, depending upon the conditions of operation of column 13, are passed through line 14 to the deisobutanizer column 15. Ordinarily a caustic wash (not shown) is interposed in line 14 for the purpose of insuring complete removal of hydrogen chloride and any traces of aluminum chloride which might be carried in the effluents. Isobutane product is recovered through line 29 and passed to storage while unconverted normal butane is recycled by way of line 16 for further conversion in the isomerization system. Small amounts of pentanes and heavier hydrocarbons formed by side reaction may be continuously or intermittently removed from this stream. Light gases formed by side reactions or otherwise introduced into the system may be periodically or continuously removed at any point in the system, for example by venting uncondensed gases from the top of accumulator 10. These and other auxiliary methods of operation are well understood by those skilled in the art and hence need not be described in further detail in order to give a full appreciation of the invention. Hydrogen may be used in the system if desired to suppress side reactions in accordance with principles known to the art.

It will be appreciated that the particular size and method of construction of the various chambers and other units of equipment will be dictated by the feed stock available and various economic conditions. Accordingly, the length of a complete cycle is dependent upon these factors and will generally be at least several days in length and may in some case extend for considerably longer periods of time. As stated before, the practice of this invention enables an appreciably longer conversion cycle to be utilized than would otherwise be the case, with consequent economies in labor, and other advantages attendent upon smooth uninterrupted operation. While the process has been described in particular detail as applied to the vapor phase isomerization of normal butane using aluminum chloride and the corresponding hydrogen halide, it may be applied with suitable modifications to other hydrocarbon conversions in the liquid or vapor phase, and the invention is not to be unduly limited by the specific conditions given in illustrating the principles thereof.

I claim:

1. In a method of desorbing a volatile metal halide of the Friedel-Crafts type from a solid adsorbent material which comprises passing in contact with such a material having such a metal halide adsorbed thereon a substantially anhydrous vaporous stream of a gas which is substantially non-reactive with the metal halide under the conditions of use in admixture with a hydrogen halide the halogen of which corresponds to the halogen of said metal halide, at temperatures and pressures conducive to desorption of said metal halide, the improvement which comprises progressively increasing the hydrogen halide partial pressure during said passage to provide a hydrogen halide partial pressure higher in the later than in the earlier periods of the desorption operation.

2. A method of desorbing a volatile metal halide of the Friedel-Crafts type from admixture with a solid inorganic adsorbent which comprises passing in contact with such an admixture a vaporous stream comprising a major proportion of a gas which is substantially non-reactive with the metal halide under the conditions of use and a minor proportion of a hydrogen halide whose halogen corresponds to the halogen of said metal halide, at elevated temperatures conducive to desorption of said metal halide, and then increasing the hydrogen halide content of said vapor stream to a value above about 50 mol per cent to effect a more complete desorption of metal halide than would otherwise be effected in the absence of said increased hydrogen halide content.

3. A method of recovering anhydrous aluminum chloride from a solid adsorbent material which comprises passing over such a material, which has aluminum chloride in admixture therewith, anhydrous hydrogen chloride at a temperature sufficient to remove a substantial quantity of aluminum chloride from said adsorbent.

4. A method of recovering anhydrous aluminum chloride from a solid adsorbent material which comprises passing over such a material, which has aluminum chloride in admixture therewith, anhydrous hydrogen chloride at a temperature sufficient to remove a substantial quantity of aluminum chloride from said adsorbent, and recovering thus-removed aluminum chloride from said hydrogen chloride.

5. A method of desorbing a volatile metal halide of the Friedel-Crafts type from a solid adsorbent material which comprises passing over such a material having such a metal halide adsorbed thereon a substantially anhydrous vaporous stream of a gas which is substantially non-reactive with the metal halide under the conditions of use in admixture with a minor proportion of a hydrogen halide the halogen of which corresponds to the halogen of said metal halide, at temperatures and pressures conducive to desorption of said metal halide, and gradually increasing the hydrogen halide content of said vaporous stream to effect a more complete desorption of metal halide than would otherwise be effected in the absence of said increased hydrogen halide content.

6. A method of desorbing a volatile metal halide of the Friedel-Crafts type from a solid adsorbent material which comprises passing over such a material having such a metal halide adsorbed thereon a substantially anhydrous vaporous stream of a gas which is substantially non-reactive with the metal halide under the conditions of use in admixture with a minor proportion of a hydrogen halide the halogen of which corresponds to the halogen of said metal halide, at temperatures and pressures conducive to desorption of said metal halide, and gradually increasing the hydrogen halide content of said vaporous stream to effect a more complete desorption of metal halide than would otherwise be effected in the absence of said increased hydrogen halide content, and recovering thus-desorbed metal halide from said vaporous stream.

7. A method of desorbing a volatile metal halide of the Friedel-Crafts type from a solid adsorbent material which comprises passing over such a material having such a metal halide adsorbed thereon a vaporous stream of a low-boiling saturated hydrocarbon in admixture with a minor proportion of a hydrogen halide the halogen of which corresponds to the halogen of said metal halide, at temperatures and pressures conducive to desorption of said metal halide, and gradually increasing the hydrogen halide content of said vaporous stream to effect a more complete desorption of metal halide than would otherwise be effected in the absence of said increased hydrogen halide content.

8. The method of claim 5 wherein said metal halide is an aluminum halide.

9. The method claim 5 wherein said metal halide is aluminum chloride.

10. The method of claim 5 wherein said solid adsorbent material comprises alumina.

11. The method of claim 5 wherein said solid adsorbent material is bauxite.

12. The method of claim 5 wherein said non-reactive gas is hydrogen.

SAMUEL C. CARNEY.

REFERENCES CITED

The following references are of record in the file of this patent:

UNITED STATES PATENTS

| Number | Name | Date |
| --- | --- | --- |
| 2,429,218 | Carney | Oct. 21, 1947 |